March 9, 1965 R. N. INGLE 3,172,535
RETAINER CLIP FOR BELLEVILLE SPRING ASSEMBLY
Filed Feb. 19, 1964

INVENTOR
ROBERT N. INGLE

BY Scrivener, Parker, Scrivener & Clarke
ATTORNEYS

United States Patent Office 3,172,535
Patented Mar. 9, 1965

3,172,535
RETAINER CLIP FOR BELLEVILLE
SPRING ASSEMBLY
Robert N. Ingle, Kettering, Ohio, assignor to Associated Spring Corporation, Bristol, Conn., a corporation of Delaware
Filed Feb. 19, 1964, Ser. No. 346,000
3 Claims. (Cl. 206—65)

This invention relates broadly to Belleville springs assembled in superposed relation to form a stack and, more particularly, provides a retainer clip for holding a group of such springs in stacked assembled relation.

Belleville springs are now often assembled for shipment, and sometimes for use, in superposed stacked relation and are held in this condition by means of an adhesive compound. When the springs are used the adhesive must be removed and, in addition, is unsightly. Further, the addition of the adhesive adds a number of operations to the assembly of the springs, thereby increasing the cost.

Figure 1:
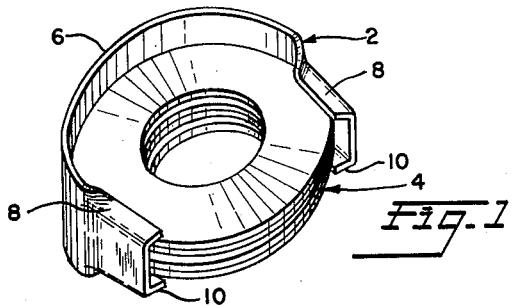
FIG. 1 is a perspective view of a stack of superposed Belleville springs held in assembled relation by the retainer clip provided by this invention.

By this invention I have provided a clip for holding in assembled relation a stack of superposed Belleville springs. This clip is shown at 2 in the drawings, holding in assembled relation a stack of four superposed Belleville springs which are indicated at 4, it being understood that a greater or lesser number of springs may be included in the stack and that the dimensions of the clip will be modified accordingly.

Figure 4:
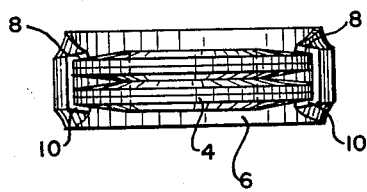
FIG. 4 is a front elevational view.

The clip 2 comprises a C-shaped body formed of strip spring steel, having an arcuately curved center part 6 which is flat in cross-section, and adjacent each of its free ends having its side edges deformed inwardly to form inwardly turned, substantially parallel flanges 8, 10. The inner surfaces of the two flanges at each free end of the clip are spaced apart by a distance just sufficient to firmly engage the outer surfaces of the end springs of the stack, as particularly shown in FIG. 4 of the drawings.

The length of the gap between the free ends of the clip is somewhat less than the outside diameter of the springs for which the clip is designed to be used, so that when the clip is assembled to a stack of springs and the springs are pushed within the clip there will be an interference fit between the flanged free ends of the clip and the springs, causing a static load to be placed on the springs which holds the spring assembly in place within the clip.

Figure 2:
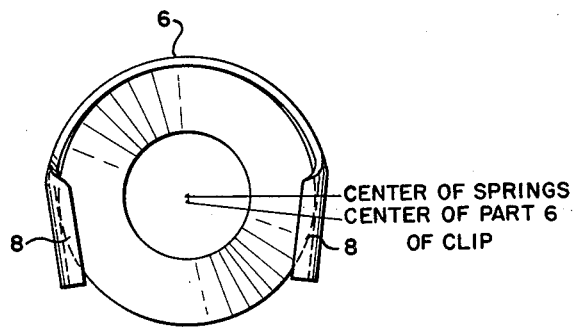
FIG. 2 is a top plan view of the assembled spring and clip shown in FIG. 1.
Figure 3:
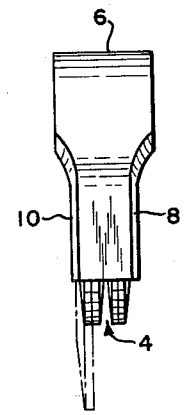
FIG. 3 is a side elevational view of the assembly shown in FIG. 2.

As clearly shown in FIG. 2 of the drawings when the springs are assembled within the clip the flat strip part 6 of the clip is arcuately curved about a center which is displaced from the center of the circular springs by a small distance such displacement being in the direction of the center of the gap between the free ends of the clip. This causes the static load exerted by the flanged ends of the clip to be exerted on the springs at a point spaced forwardly of the centers of the spring, i.e. toward the gap between the ends of the clip, thereby urging the springs within the clip and requiring that the flanged ends of the clip be spread as the springs are drawn out from the clip.

The retainer clip provided by the invention may be made in any size to accommodate any size of springs or any number of springs. The cost of the retainer is so small that the clip is disposable after the springs have been removed from it. By reason of its use, a number of operations may be eliminated in the manufacture of an assembly of springs which is to be shipped as a unit, which operations have heretofore been necessary in connection with the joining of the springs into an assembly by the use of an unsightly adhesive.

While I have illustrated and described one embodiment of my invention, it will be apparent to those skilled in the art to which it relates that other embodiments, as well as modifications of that disclosed, may be made and practiced without departing in any way from the scope of the invention, for the limits of which reference must be made to the appended claims.

What is claimed is:

1. A clip for holding in assembled relation a stack of un-interconnected circular pieces such as Belleville springs, comprising a C-shaped body formed of flat spring strip metal, the central part of said body being arcuate and substantially flat in cross-section and of sufficient width to substantially cover the edge of the stack which the clip is designed to hold, the two side edges of the clip at and adjacent each of the free ends of the C-shaped body being bent inwardly of the body into substantial parallelism with each other forming flanges spaced apart a sufficient distance to closely engage the exterior surfaces of the end members of a stack positioned within the clip.

2. A clip for holding in assembled relation a stack of un-interconnected circular pieces such as Belleville springs, comprising a C-shaped body formed of flat spring strip metal, the central part of said body being arcuate and substantially flat in cross-section and of sufficient width to substantially cover the edge of the stack which the clip is designed to hold, the two side edges of the clip at and adjacent each of the free ends of the C-shaped body being bent inwardly of the body into substantial parallelism with each other forming flanges spaced apart a sufficient distance to closely engage the exterior surfaces of the end members of a stack positioned within the clip, the curvature of the arcuate central part of the clip being so related to the curvature of the periphery of the stack which the clip is designed to hold that the center of such arcuate central part is displaced from the center of the stack in the direction of the space between the free ends of the clip.

3. A clip for holding in assembled relation a stack of un-interconnected circular pieces such as Belleville springs, comprising a C-shaped body formed of flat spring strip metal, the central part of said body being arcuate and substantially flat in cross-section and of sufficient width to substantially cover the edge of the stack which the clip is designed to hold, the two side edges of the clip at and adjacent each of the free ends of the C-shaped body being bent inwardly of the body into substantial parallelism with each other forming flanges spaced apart a sufficient distance to closely engage the exterior surfaces of the end members of a stack positioned within the clip, the flanged free ends of the clip converging toward each other and the arcuate central part of the clip and the free ends thereof being of such length that parts of the free ends engage the sides of the stack at points displaced from the center of the stack in the direction of the space between the free ends of the clip.

References Cited by the Examiner
UNITED STATES PATENTS
2,477,650  8/49  Pool _____ 206—65 X
3,053,384  9/62  Loomis _____ 206—46

THERON E. CONDON, Primary Examiner.